United States Patent [19]

Kelly

[11] Patent Number: 4,993,060
[45] Date of Patent: Feb. 12, 1991

[54] PORTABLE DEVICE FOR USE BY A NEWS REPORTER

[76] Inventor: Gavan E. Kelly, 9 Richmond Court, 4 Queens Road, Kingston, Surrey KT2 7ST, United Kingdom

[21] Appl. No.: 423,634

[22] Filed: Oct. 18, 1989

Related U.S. Application Data

[63] Continuation of Ser. No. 159,386, Feb. 23, 1988, abandoned.

[51] Int. Cl.$^5$ .................. H04M 9/00; H04M 1/64; H04M 1/00
[52] U.S. Cl. ........................................ 379/55; 379/87; 379/392; 379/395; 379/403; 379/443
[58] Field of Search ................. 379/55, 87, 106, 381, 379/391, 392, 395, 402–404, 406, 409, 410, 442–444

[56] References Cited

U.S. PATENT DOCUMENTS

| | | | |
|---|---|---|---|
| 2,868,879 | 1/1959 | Berman et al. | 379/160 |
| 2,924,670 | 2/1960 | Dee | 379/434 |
| 3,748,397 | 7/1973 | Jones | 379/395 |
| 3,875,350 | 4/1985 | Fischer | 379/404 |
| 4,446,335 | 5/1984 | Lee et al. | 379/382 |
| 4,536,618 | 8/1985 | Serrano | 379/277 |
| 4,590,331 | 5/1986 | Nunemaker et al. | 379/201 |
| 4,605,975 | 8/1986 | Beaman | 379/87 |

FOREIGN PATENT DOCUMENTS

| | | | |
|---|---|---|---|
| 0702078 | 1/1954 | United Kingdom . | |
| 1115216 | 5/1968 | United Kingdom | 379/404 |
| 1430982 | 4/1976 | United Kingdom . | |
| 2106355 | 4/1983 | United Kingdom | 379/395 |
| 2180121 | 3/1987 | United Kingdom | 379/395 |

OTHER PUBLICATIONS

A. J. Eisenberg, "Telephone Coupling Transformers", Engineering Application Bulletin, 1972.

Primary Examiner—Jin F. Ng
Assistant Examiner—Wing F. Chan
Attorney, Agent, or Firm—Pearne, Gordon, McCoy & Granger

[57] ABSTRACT

A portable device to be carried by a reporter and coupled to a telephone line to a location from which the reporter wishes to transmit a report to a broadcast station to be broadcast live has a casing with a microphone (1) for voice input, a tape input (2) for receiving a tape signal and a monitor (3) for providing acoustic signal to the reporter.

The device has signal conditioning circuitry including voice control gain adjustment (20) and amplification (5) for providing a signal to be transmitted by the telephone line in a form suitable for broadcasting. The device is coupled to the telephone line by a hybrid transformer arrangement (7 to 14) which serves to cancel unwanted components of the signal to be sent down a telephone line from that to be received from the telephone line. The device is portable and has its own power supply in the form of batteries or connections for an AC mains auto supply.

12 Claims, 4 Drawing Sheets

PORTABLE DEVICE FOR USE BY A NEWS REPORTER

This is a continuation of application Serial No. 07/159,386, filed on Feb. 23, 1988 now abandoned.

This invention relates to a portable device to be carried by a sender, for example a news reporter, and for coupling to a telephone line for transmitting signals between the sender and a remote receiver connected to the telephone line.

It is often desired for a reporter in one location to transmit to a broadcasting station in another location a report of events occurring in the one location. The broadcasting station then broadcasts the report live, i.e. as it is received from the reporter. Generally, this is done via a telephone line using an existing telephone instrument. The quality of the signal received over the telephone line is restricted by the electronics provided in the telephone instrument. Currently available instruments are designed to give a level of performance which is not sufficient for broadcasting, since the signal received over the telephone line may be subject to distortion in excess of a level acceptable for broadcasting. It is therefore necessary to provide in the broadcast station equipment for processing the signals received over the telephone line from the reporter in order to obtain a signal suitable for broadcast transmission. Often the signals obtained over the telephone line are unsatisfactory for broadcast transmission even after processing. Further, where such live reports are required, it is necessary for the broadcast station to be suitably equipped, with equipment which is often bulky and expensive.

A particular problem during such live reports is that the voice level of the reporter may fluctuate considerably, causing problems for the processing equipment where the signal is to be broadcast by the broadcasting station.

According to one aspect of the present invention, there is provided a portable device to be carried by a reporter and for coupling to a telephone line for transmitting and receiving signals between the reporter and a broadcast station at which a receiver is connected to the telephone line, the device comprising a casing
  an input for a voice signal;
  voice controlled gain adjustment means coupled to said input for adjusting the voice signal to provide an output signal with reduced amplitude fluctuation;
  signal receiving means for receiving a signal from the broadcast station;
  a first transformer arrangement comprising a primary winding connected to receive said output signal and a secondary winding inductively coupled to the primary winding and adapted to be connected to the telephone line for sending to the broadcast station said output signal in a form suitable for broadcast transmission; and
  a second transformer arrangement having a primary winding adapted to be connected to the telephone line for receiving a signal from the broadcast station and secondary winding means having a first winding connected to said signal receiving means and a second winding intercoupled to a winding of the first transformer arrangement by a cross-over inductive coupling arrangement whereby the voice signals to be sent can be substantially cancelled from a signal being received from the broadcast station.

Preferably, there is an amplifier coupled to the second coupling means to amplify the signal received thereby.

According to another aspect of the present invention there is provided a portable device to be carried by a sender and for coupling to a telephone line for transmitting signals between the sender and a remote receiver connected to the telephone line, the device comprising a casing having:
  an input for a voice signal;
  first coupling means for inductively coupling the input to the telephone line for sending to the remote receiver said voice signal in a form suitable for broadcast transmission;
  second coupling means for inductively coupling to the telephone line for receiving a signal from the remote receiver, the first and second coupling means comprising transformer windings, and
  a cross-over coupling arrangement for reducing that portion of the transmitted voice signal which is coupled from the first to the second coupling means so that it does not affect the signal received from the remote receiver.

According to a further aspect of the present invention there is provided a method of communicating via a telephone line by transmitting a voice signal via the telephone line to a remote receiver and by monitoring signals sent from the remote receiver by way of the telephone line, the method comprising the steps of:
  subjecting said voice signal to voice-controlled gain adjustment to reduce amplitude fluctuations of the said voice signal;
  transferring said adjusted voice signal onto the telephone line;
  simultaneously monitoring said telephone line for received signals; and
  transducing said received signals into acoustic signals.

For a better understanding of the present invention, and to show how the same may be carried into effect, reference will now be made, by way of example, to the accompanying drawings, in which.

Figure 1:
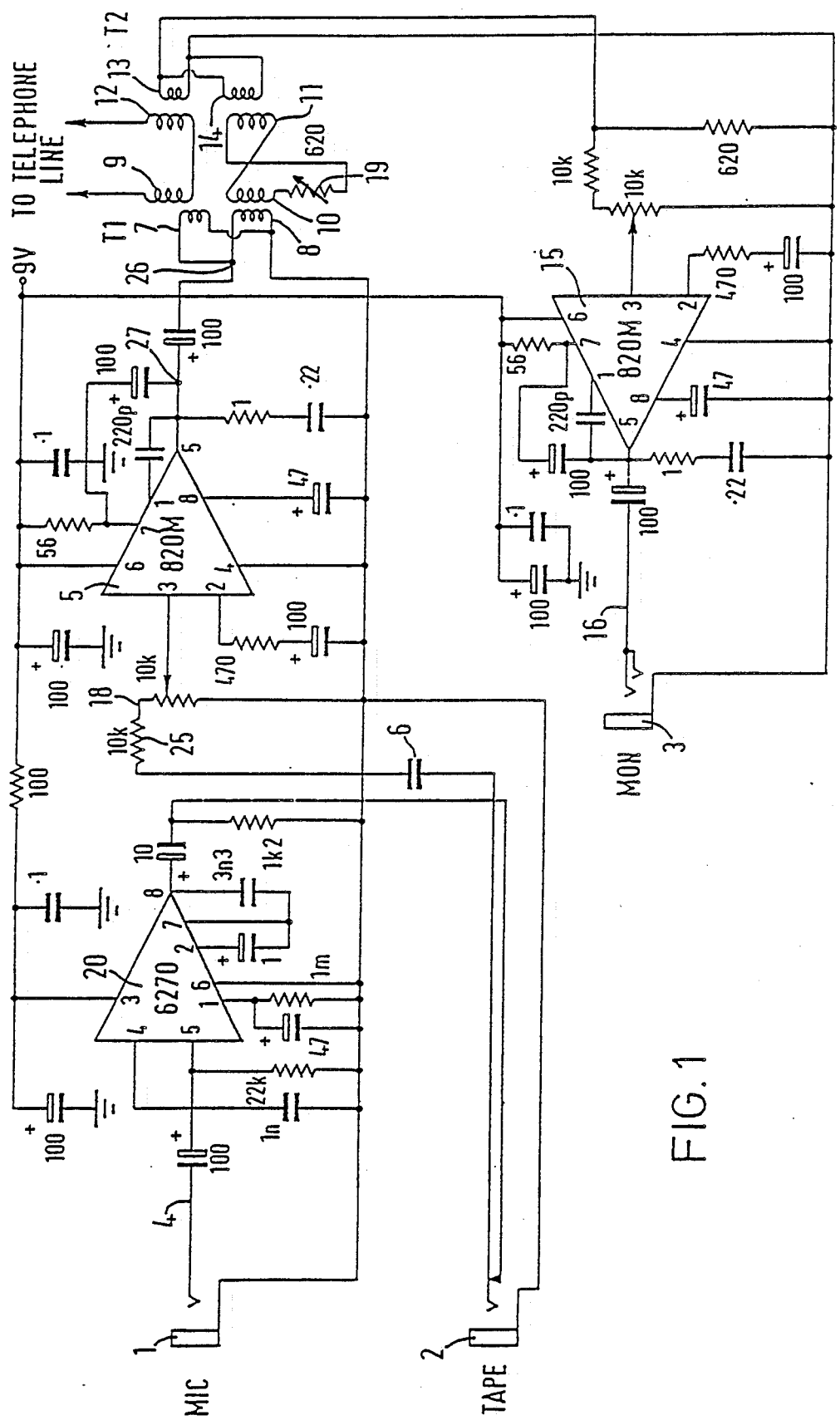
FIG. 1 is a schematic diagram of one form of a portable device to be carried by a reporter.

FIG. 1 illustrates one form of a portable device which can be carried by a reporter and coupled to a telephone line at a location from which the reporter wishes to transmit a report to a broadcast station to be broadcast live. The device is capable of providing a signal which is suitable directly for broadcast transmission at the broadcast station. The report may be spoken by the reporter, or it may be pre-recorded on a tape and then transmitted.

The device consists of a casing having a microphone 1 for inputting a voice signal from the reporter, a tape input 2 for receiving a taped signal, and a monitor 3 for providing acoustic signals to the reporter derived from signals sent by a remote receiver. Thus two way communication is enabled.

A voice-controlled gain adjustment device 20, for example type 6270 manufactured by Plessey is coupled to receive the voice signal from the microphone along input line 4. The voice-controlled gain adjustment device is designed to accept signals from a low output microphone 1 and to provide an essentially constant output signal of 90 millivolts for a 60 dB range of input. The output signal for the voice-controlled gain adjustment device is fed to an amplifier 5, for example type TBA 820M. The amplifier 5 also receives the signal from the tape input 2, frequency shifted by means of a capacitor 6. The output from the amplifier 5 is fed to the primary windings 7,8 of a first transformer T1, these windings 7,8 being connected in parallel. The secondary windings 9,10 of the first transformer are arranged so that the winding 9 is connected to the telephone line, while the winding 10 forms part of a cross-over coupling arrangement with a secondary winding 11 of a second transformer T2. The other winding 12 of the second transformer serves to couple a signal received down the telephone line to winding 13, connected in parallel with winding 14. It is possible to adopt an alternative configuration of the windings 13 and 14, as discussed later, where a "record-out" signal is to be provided.

The signal coupled into winding 13 is fed to an amplifier 15, the output 16 of which is fed to the monitor 3 for conversion into acoustic signals so that the reporter can listen to the received signal.

The transformer coupling arrangement (7 to 14) serves to cancel unwanted components of the signal to be sent down the telephone line from that to be received from the telephone line. This cancellation occurs since the output signal from the amplifier 5 is fed in phase to windings 7 and 8, so that an unwanted component of the signal which couples to winding 13 is in phase with that in winding 7, while the unwanted component coupled to winding 14 is, by virtue of the cross-over arrangement, out of phase with that in winding 8. Accordingly, the unwanted components are substantially cancelled at the second transformer windings 13 and 14. If it were possible to obtain perfect matching of impedances, total cancellation would be effected. However, the impedance of a telephone line will vary, and it has been found that by inserting a resistor 19 having a nominal value of 1250Ω in series with the winding 10 a good degree of cancellation is obtained for medium range telephone calls. A lower value (e.g. 400-500Ω) is suitable for "local" calls, and a higher value (e.g. 700-800Ω) for "long distance" calls. It would be possible to provide a variable resistor here for adjustment by a user to achieve the best possible cancellation for each location. If total cancellation is not achieved, the sender will be able to hear the signals which he is transmitting, which may be desirable in some cases.

The portable device can be carried by a reporter and can be connected directly to a telephone line or to handset terminals in any convenient location. After dialling, the telephone instrument may be hung up. the signal received down the telephone line is amplified by the amplifier 15, and is fed to monitor 3 so that the reporter can listen to information being transmitted to him from the broadcast station. He can then transmit information to the broadcast station by either speaking into the microphone 1 or by providing a taped signal from a tape recorder at the tape input 2 to transmit that signal down the telephone line. The recorded input from the tape input 2 could in theory be fed to the voice-controlled adjustment device, but in practice it is not found to be necessary since the recorded output will not normally be subject to the fluctuations present in a voice signal. The device enables a reporter to transmit down a telephone line audio information (from a tape or microphone), with the signal supplied to the telephone line being of a very high quality and so suitable for broadcast transmission at the broadcast station. The unit therefore enables interviewers to conduct question and answer reports live or pre-recorded for immediate broadcast.

Figure 2:
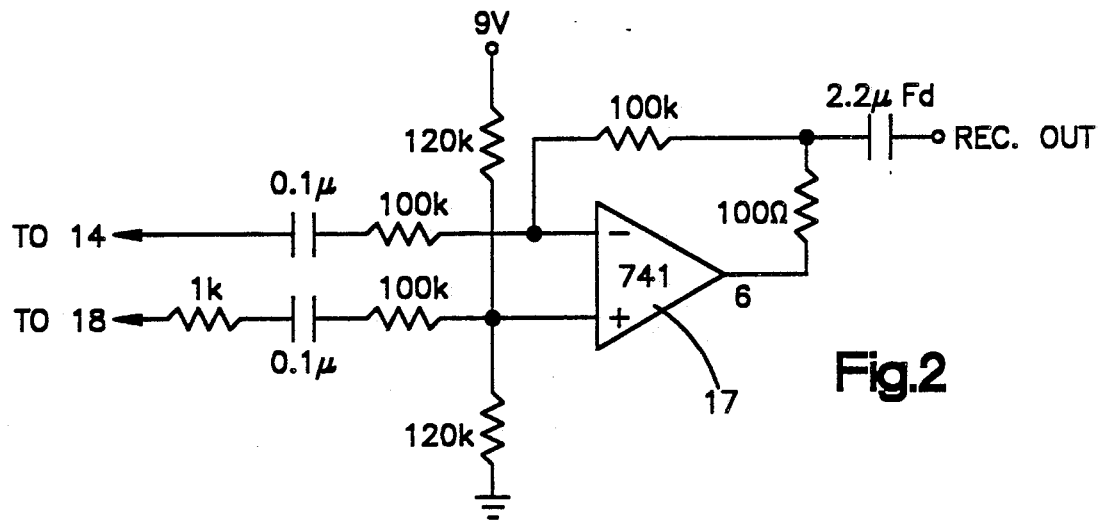
FIG. 2 illustrates an amplifier which may be added for a "record-out" signal.
Figure 3:
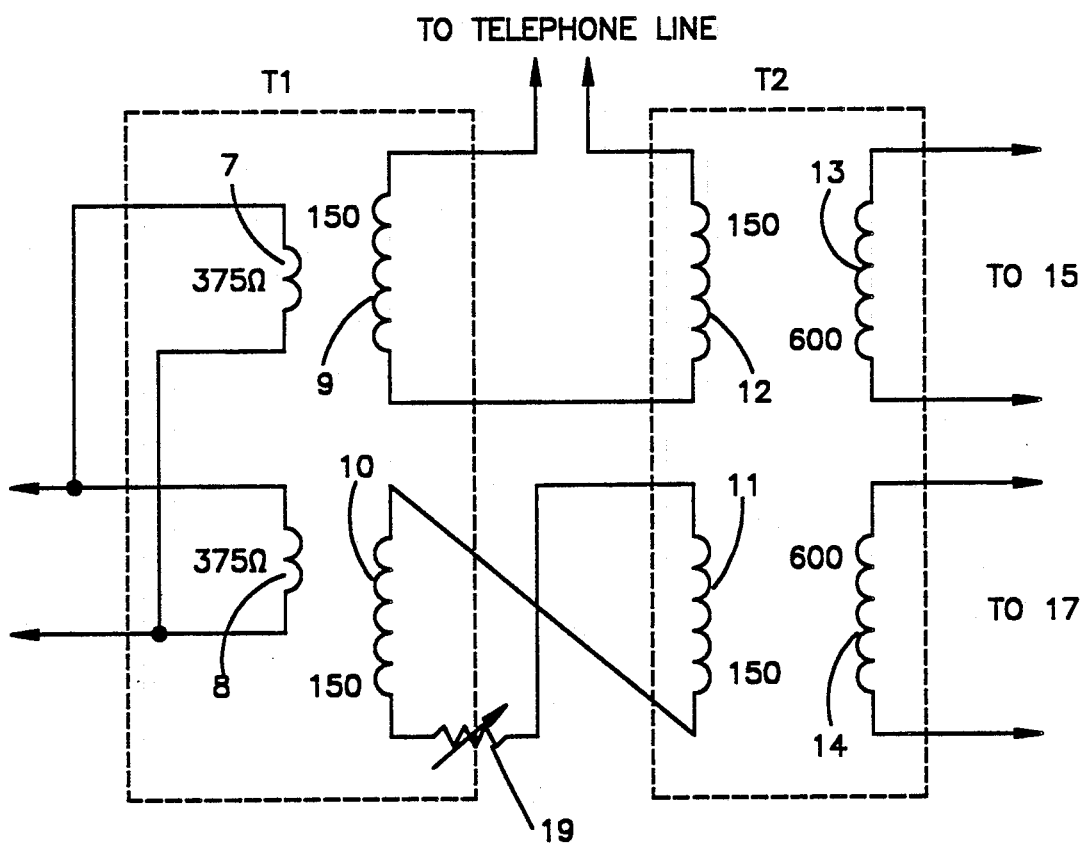
FIG. 3 illustrates diagrammatically a coupling arrangement where a record-out signal is to be provided.

It is possible to provide a device which provides a "record-out" signal which will enable a tape or casette machine to record the transmitted and received signals. FIG. 2 illustrates a record-out amplifier 17, e.g. LN741 for amplifying the record-out signal. FIG. 3 illustrates the transformer winding arrangement for use with such a device, from which a different arrangement of windings 13, 14 of the second transformer T2 can be seen. The record-out amplifier 17 receives the signal from winding 14 of the second transformer at its inverting input, and from the voice-controlled gain adjustment device at point 18 in FIG. 1 at its non-inverting input. Thus, the received signal (on winding 14) is mixed with the signal from the tape 2 and microphone 1 in the differential amplifier 17 in such a way that these signals are in phase and balanced to give a combined record output of both send and received signals. The take-off point 18 may be "upstream" of the 10K resistor 25: the resistor 25 has the effect of producing a drop in level of about 3dB.

Figure 4:
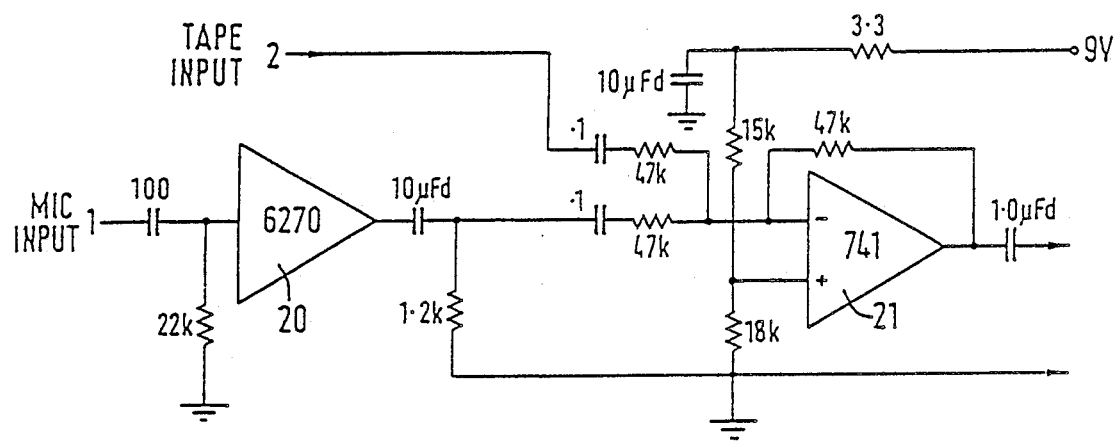
FIG. 4 illustrates one arrangement which may be used to mix voice and taped input signals.
Figure 5:
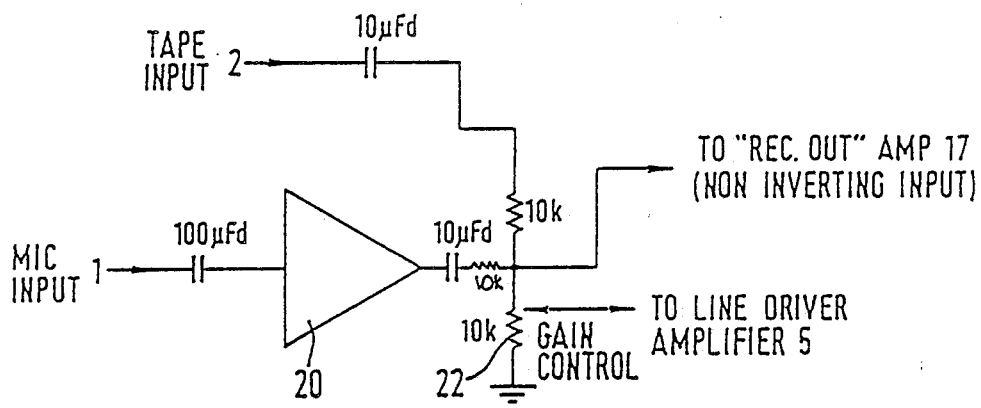
FIG. 5 shows one form of mixing arrangement.

Mixing of the voice and taped input signals may be effected by the arrangement shown in either FIG. 4 or FIG. 5.

In the arrangement of FIG. 4 the tape input 2 and voice input 1 (after voice controlled gain adjustment in device 20) are fed to an operational amplifier 21 connected as a summing amplifier with unity gain. The amplifier may be, for example type LM741. The output of the amplifier 21 is fed to the amplifier 5 (FIG. 1) or, if no further amplification is required, directly to the transformer T1.

In the arrangement of FIG. 5, the tape input 2 and the voice input 1 (after voice controlled gain adjustment) are fed directly to the non-inverting input of the "record-out" amplifier 17 (FIG. 2). The "record-out" amplifier 17 performs the mixing function. The signal for the amplifier 5 (FIG. 1) is taken from a potentiometer 22 connected between the output of device 20 and ground to enable gain control to be effected. While the differential amplifiers described herein are of the type LM741, it will be appreciated that any suitable amplifier may be used. Some examples are 071, 3140E, SL 561C and 5534.

It may be possible for some applications to effect a form of voice controlled gain adjustment by using a low noise pre-amplifier for amplifying the voice input, with an operational amplifier and FET device.

A particular advantage of the unit is that it can be housed in a small durable case made of plastics material and measuring 110 mm×68 mm×33 mm.

The casing may have connection for an a.c. voltage supply and/or a battery. Respective LEDs on the casing can indicate when the power is on and when the battery needs replacing.

It is also possible to provide a level indicator, for example in the form of an LED having two flashing modes, one for indicating the correct level and the other for indicating a level some 2 or 3 dB in excess of the correct level. The input for the indicator could be at any convenient location, for example point 26 or 27 in FIG. 1.

The portable device may be connected directly to the telephone line using a conventional jack or to the handset terminals. The telephone handset may be hung up after dialling, and the reporter can then monitor incoming signals using a pair of headphones at the monitor 3.

Figure 6:
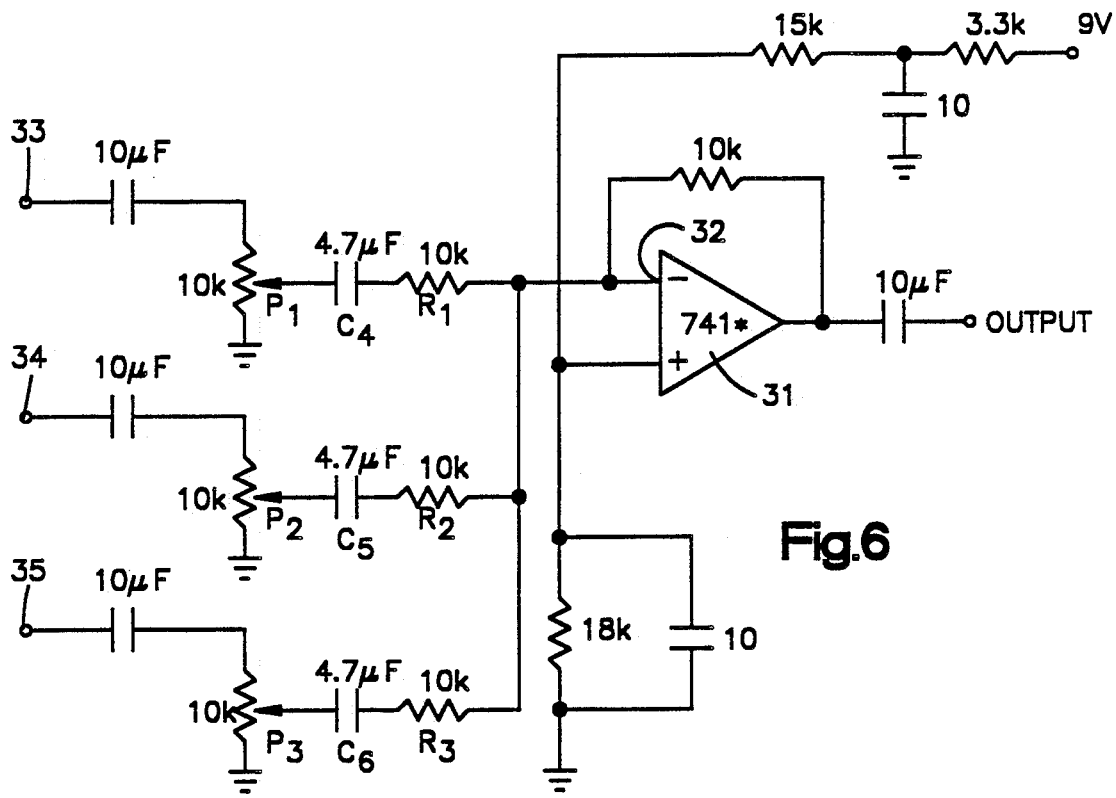
FIG. 6 shows another form of mixing arrangement.
Figure 7:
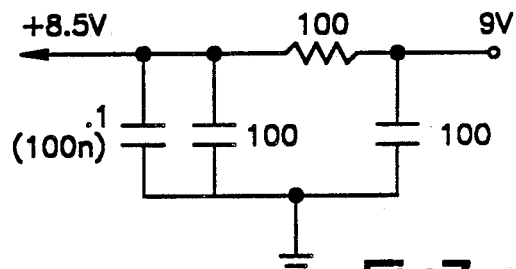
FIG. 7 shows a power supply.
Figure 8:
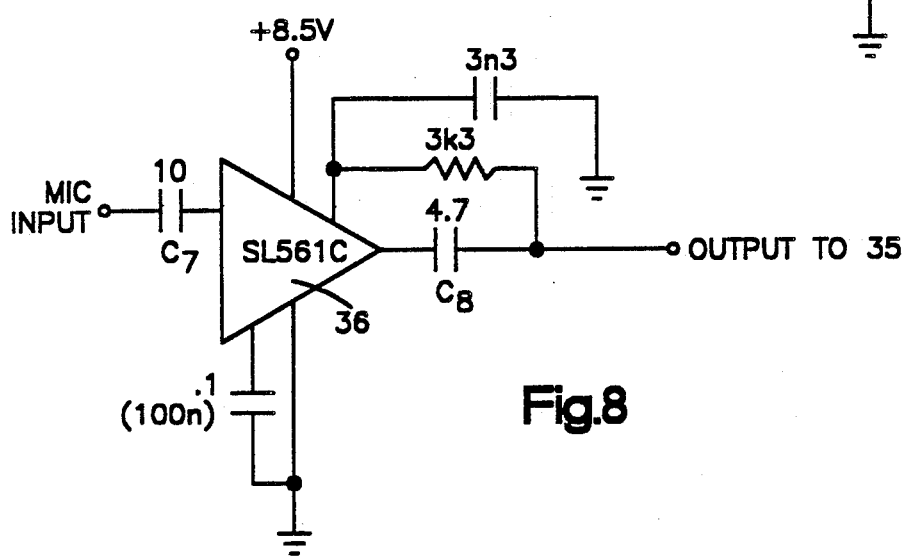
FIG. 8 shows preamplifying circuitry for use with the mixing arrangement.

FIG. 6 shows a mixing arrangement arranged to receive three input signals and to output a mixed signal to the tape input 2 of the portable device. The mixing arrangement comprises a virtual earth type operational amplifier 31. Type 741, OP07 or similar equivalents are suitable. The inverting input 32 of the amplifier 31 is connected to three inputs 33, 34, 35 via, in each case, a decoupling capacitor $C_1$, $C_2$, $C_3$, of value 10 $\mu$F, and a 10 kiloohm resister $R_1$, $R_2$, $R_3$. The inputs 33, 34, 35 can receive, for example, respectively a microphone signal and tape or other line level audio signals. The microphone signal can first be passed through a preamplifying arrangement as shown in FIG. 8. The preamplifying arrangement comprises an amplifier 36, for example of type SL561C, 5534 or similar, with decoupling capacitors $C_7$, $C_8$ at input and output. The power supplies to the amplifier are shown in FIG. 7, but any suitable supply could be used.

I claim:

1. A portable device to be carried by a reporter and for coupling to a telephone line, the device comprising:
    an input for a voice signal;
    voice controlled gain adjustment means coupled to said input for adjusting the voice signal to provide an output signal with reduced amplitude fluctuation;
    a first transformer arrangement comprising a primary winding connected to said voice controlled gain adjustment means to receive said output signal, a secondary winding inductively coupled to the primary winding and adapted to be connected to the telephone line for transmitting to the broadcast station said output signal in a form suitable for broadcast transmission, and a first coupling winding;
    a second transformer arrangement having a primary winding adapted to be connected to the telephone line for receiving a signal from the broadcast station, secondary winding means inductively coupled to the primary winding of said second transformer arrangement and having a first and second distinct winding, and a second coupling winding;
    cross-coupling means intercoupling said first and second coupling windings whereby said output signals to be transmitted can be substantially, but not entirely, cancelled from a signal being received from the broadcast station;
    a first, audio, output for coupling to an audio monitor;
    a second output for coupling to a tape recorder;
    a first receiving circuit coupling said first distinct winding to the first output to provide an audio monitor signal; and
    a second receiving circuit coupling said second distinct winding to said second output to provide a tape recorder signal.

2. A device as claimed in claim 1, wherein said first receiving circuit receives signals from said telephone line and includes an amplifier for amplifying the signal received therefrom.

3. A device as claimed in claim 1, comprising resistive means of variable resistance connected between said first and second coupling windings whereby the reporter can vary the degree of cancellation to suit his requirements.

4. A device as claimed in claim 1, wherein said second receiving circuit has an input coupled to said controlled gain adjustment means to provide a tape recorder signal of said output signal of said voice controlled gain adjustment means.

5. A device as claimed in claim 1, which has a further input for receiving a pre-recorded signal which is to be transmitted to the broadcast station.

6. A portable device to be carried by a reporter and for coupling to a telephone line for transmitting and receiving signals between the reporter and a broadcast station at which a receiver is connected to the telephone line, the device comprising a casing having:
    an input for a voice signal;
    voice controlled gain adjustment means coupled to said input for adjusting the voice signal to provide an output signal with reduced amplitude fluctuation;
    signal receiving means for receiving a signal from the broadcast station;
    a first transformer arrangement comprising a primary winding connected to said voice controlled gain adjustment means to receive said output signal, a secondary winding inductively coupled to the primary winding and adapted to be connected to the telephone line for transmitting to the broadcast station said output signal in a form suitable for broadcast transmission, and a first coupling winding;
    a second transformer arrangement having a primary winding adapted to be connected to the telephone line for receiving a signal from the broadcast station, secondary winding means inductively coupled to the primary winding of the second transformer arrangement and having two distinct windings connected in parallel, said distinct windings being connected to said signal receiving means, and a second coupling winding; and
    cross-coupling means intercoupling said first and second coupling windings to provide a cross-over inductive coupling arrangement with which said output signal to be transmitted can be substantially, but not entirely, cancelled from a signal being received from the broadcast station.

7. A device as claimed in claim 6, wherein said signal receiving means includes an amplifier coupled to the secondary winding means of the second transformer arrangement for amplifying the signal received thereby.

8. A device as claimed in claim 6 which includes recording means for recording both said transmitted output signal and said signal received from the broadcast station.

9. A device as claimed in claim 6, comprising resistive means of variable resistance connected between said first and second coupling windings for varying the degree of cancellation to suit the user's requirement.

10. A portable device to be carried by a reporter and for coupling to a telephone line for transmitting and receiving signals between the reporter and a broadcast station at which a receiver is connected to the telephone line, the device comprising:
- an input for a voice signal;
- voice controlled gain adjustment means coupled to said input for adjusting the voice signal to provide an output signal with reduced amplitude fluctuation;
- signal receiving means for receiving a signal from the broadcast station;
- a first transformer arrangement comprising a primary winding connected to said voice controlled gain adjustment means to receive said output signal, a secondary winding inductively coupled to the primary winding and adapted to be connected to the telephone line for transmitting to the broadcast station said output signal in a form suitable for broadcast transmission, and a first coupling winding;
- a second transformer arrangement having a primary winding adapted to be connected to the telephone line for receiving a signal from the broadcast station, a secondary winding inductively coupled to the primary winding and connected to said signal receiving means and a second coupling winding;
- cross-coupling means intercoupling said first and second coupling windings for providing a degree of cancellation of said output to be transmitted from a signal being received from the broadcast station; and
- a variable resistance connected between said first and second coupling windings for varying the degree of cancellation to suit the users requirements.

11. A device as claimed in claim 10, wherein said signal receiving means includes an amplifier coupled to said secondary winding of second transformer arrangement for amplifying the signal received thereby.

12. A device as claimed in claim 10, which has a further input for receiving a pre-recorded signal which is to be transmitted to the broadcast station.

* * * * *